Figures 1, 3:
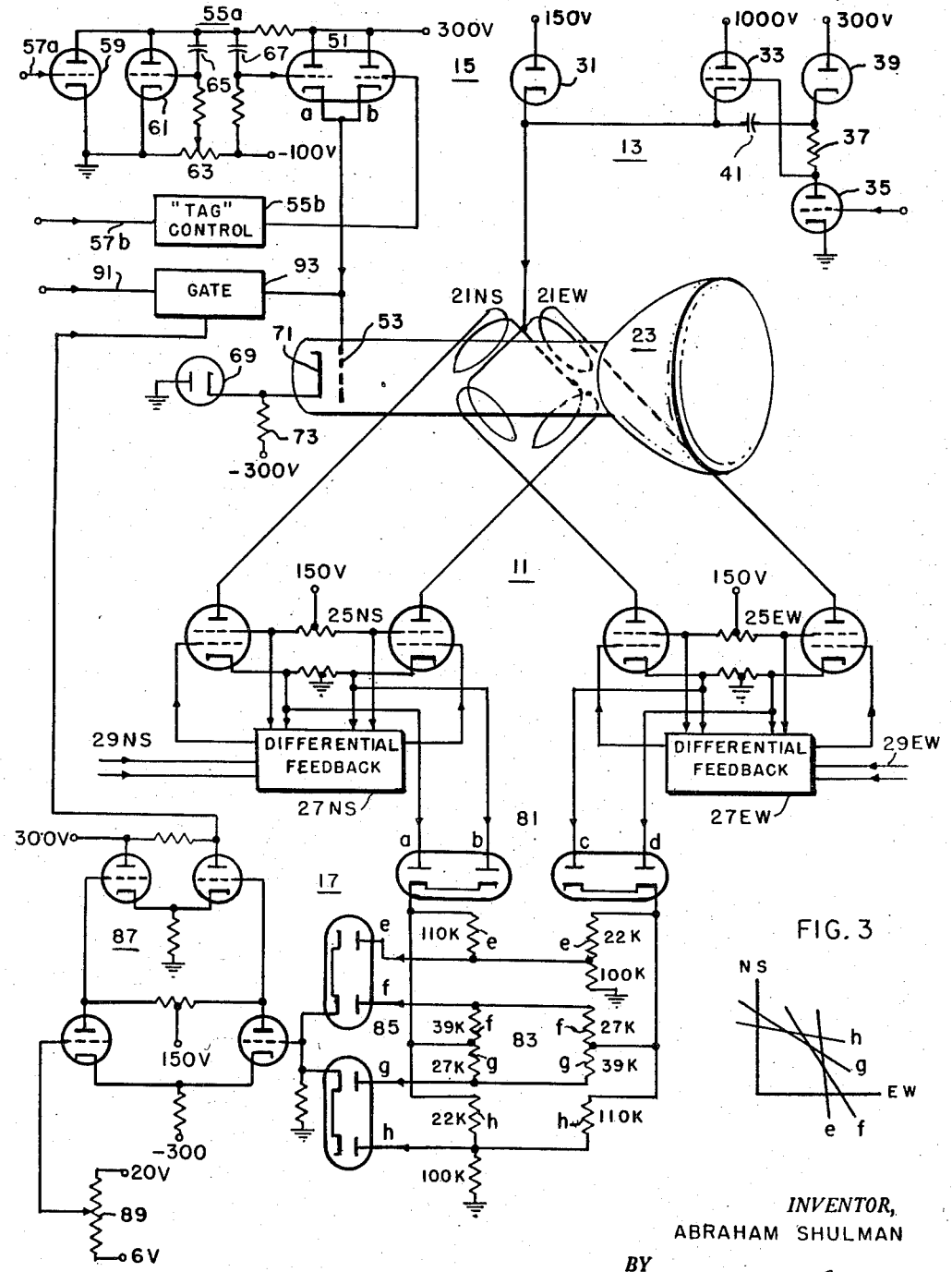

INVENTOR,
ABRAHAM SHULMAN
BY
Harry M. Saragovitz
ATTORNEY.

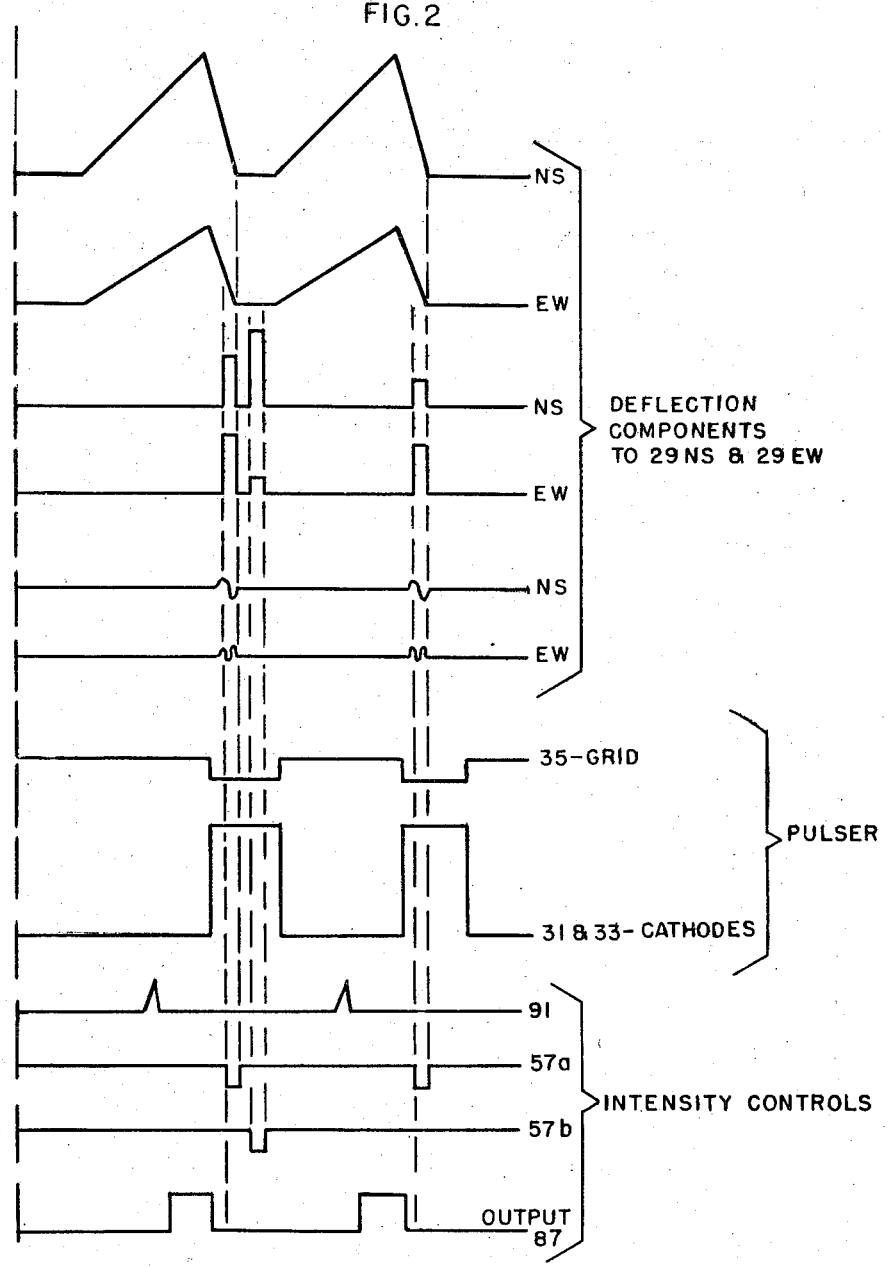

United States Patent Office 2,858,474
Patented Oct. 28, 1958

2,858,474

AREA BALANCED PULSE AMPLIFIER

Abraham Shulman, Jamaica, N. Y., assignor to the United States of America as represented by the Secretary of the Army Application February 26, 1957, Serial No. 642,629

4 Claims. (Cl. 315—22)

This invention relates to the accurate control of the intensity of a cathode ray tube beam during certain intervals of the sweep of said beam.

In ordinary television or radar systems the intensity of the beam is controlled directly by the modulation of energy received over the antenna. However, sometimes it is desirable to include on the display provided by the cathode ray tube certain additional information provided by computers or other apparatus. In order that the ordinary display information and the additional information may both be clearly visible, it is necessary that the intensity of the beam during display of the two types of information should be at proper levels to avoid either lack of brilliance or excessive brilliance at any time during the display.

An article by the present inventor in "Electronics" May 1956 describes such a P. P. I. system in which the time ordinarily allowed, after the outward radial sweep (with any intensity modulation resulting from returned echoes), for the return inward sweep (normally blanked) is also utilized for presenting extra information. In this article the extra information is derived from a plurality of automatic tracking computers and involves coordinate values corresponding to predicted positions of various objects. Various other cathode ray tube systems also might involve the insertion of extra information requiring deflection components of somewhat irregular form. The normal deflection coil currents would require brief steps during part of the interval normally used for the steep return portion of the sawtooth and therefore even steeper portions during other parts of such interval, causing a high value of the first derivative $di/dt$ of the coil current. The computed coordinates would ordinarily bear no relation to the normal sweep coordinates; therefore, one sweep coordinate might be increased and another decreased or even reversed to insert the extra information, often involving greater total change in the deflection coil currents and with less time available to accomplish such change.

To distinguish the computed information from the normal radar echoes it is often desirable to generate some simple additional scan such as a small circle, ellipse, etc. and to provide suitable spot brilliance during part or all of this additional scan or even somewhat longer, thus producing a dashed or partial circle, full circle, circle with tail, etc., commonly referred to as "tags."

To utilize both the normal sweep and computed coordinates for accomplishing the desired sweep, one suitable technique is to combine these as voltages and then use a differential feedback circuit to force the actual deflection coil current to follow this voltage waveform. Since the deflection coil currents are normally in the anode circuit of the driver amplifier, and the pulser of this invention is used to modify the available anode voltage, a direct feedback from the current in the deflection coil would be rather cumbersome. However, for convenience in the connection to the feedback circuit the deflection coil current may be readily measured in the cathode circuits of the amplifiers; in case of screen grid tubes a correction for the screen current, which flows in the cathode, but not the anode coil, may be obtained from the screen grid circuit.

The various beam deflection velocities involved in such a display require that the proper beam intensity be provided during each particular interval so that the various displays on the face of the cathode ray tube will be of suitable relative intensity.

An object of this invention is to provide suitable circuitry to furnish the proper beam intensity during each of the various intervals of the cathode ray tube beam deflection.

Other objects of the invention will be apparent from the following description and accompanying drawings, in which:

Fig. 1 shows a cathode ray tube with a deflecting system including a suitable circuit for controlling the cathode ray tube beam intensity during the various intervals of the beam deflection.

Fig. 2 includes a series of typical waveforms involved in the operation of Fig. 1.

Fig. 3 illustrates the geometric relations involved in the deflection system particularly in relation to the lower portion of Fig. 1.

Fig. 1 includes the basic display system 11 including the cathode ray tube and deflection amplifiers connected in the customary manner and the cathode ray tube beam intensity control circuit 15 forming the subject matter directly involved in the present invention. Fig. 1 also includes a further beam intensity control circuit 15 to eliminate loss of contrast in the display from energization directed beyond the limits of the tube face and causing a diffused glow thereover and an anode pulser circuit 13 to provide increased anode voltages for the driver amplifiers during any period when the rate of change of deflection coil current is so high that increased anode voltage is needed to overcome the deflection coil inductance. These circuits are the subject matter of applications by the present inventor for Off Screen Blanking Circuit and Anode Pulser, Serial Nos. 642,630 and 642,631, respectively, filed concurrently herewith.

As shown in Fig. 1 the deflection coil 21NS on cathode ray tube 23 is controlled by the push-pull driver 25NS. The cathode and screen-grid currents in this driver are supplied to a differential feedback system 27NS which has as one function to subtract the screen-grid currents from the cathode currents and thereby determine the actual plate current which passes thru the deflection coil. The voltage input 29NS, intended to establish the actual waveform of the deflection current, is also supplied to the differential feed back system which has a second function to regulate the control grids of the drivers 25NS by the input waveform and the actual current in the deflection coil as determined by the subtraction so that the current waveform in the deflection coil actually corresponds to the voltage waveform supplied at the input 29NS to the differential feedback system. A similar deflection coil 21EW and corresponding circuits provides for the deflection at right angles to that provided by coil 21NS. The deflection voltage input to differential feedback systems 27NS, and 27EW, includes components corresponding to the normal P. P. I. sweep and any offset voltage therefor, and also the computed coordinates; tag generating voltage, etc. from each computer in use.

In the intensity control circuit 15, a plurality of cathode follower circuits 51a and b are connected to the grid 53 of the cathode ray tube 23 to control the beam intensity. The bias applied to this control grid might be arranged to permit a fairly substantial beam current during the generation of a tail marker and circle marker, which involve rather rapid beam deflection velocity, and a somewhat smaller beam current during the generation of a mere dot marker, which is accomplished while the beam is substantially at rest. The desired bias is under the control of area balancing circuits 55a and b; one of which is shown in diagrammatic form. The necessary pulse inputs for control of the particular biases at the proper times are accomplished at the input circuits 57a and b. In the circuit 55a, the triode 59 is normally conducting to maintain the anodes of such triode and a further normally nonconducting triode 61 at a low potential. When a particular marker is to be applied, the grid of tube 59 receives a negative gating pulse causing its anode to rise in voltage. However, the triode 61 is provided with a plate-to-grid coupling condenser 65 and therefore starts to conduct as soon as the grid voltage rises above the cutoff potential of the triode. The normal setting of the grid bias of the tube 61 is accomplished by a potentiometer 63. The rise in anode voltage of the tubes 59 and 61 is terminated as soon as the triode 61 starts to conduct. A further capacitor 67 from this anode circuit is connected to the control grid of the cathode follower 51a to apply the proper bias voltage to the control grid 53 of the cathode ray tube. The nature of the computer circuitry is such that the additional marker pulses may be applied at rather irregular intervals; however, the similarity of the coupling circuits thru the capacitors 65 and 67 assures that substantially the same conditions will exist in both portions of the coupling circuit and therefore the cathode ray beam intensity will consistently follow the particular setting of the potentiometer 63. Otherwise stated the coupling capacitor 65 acts as a compensation for the inadequacy of the coupling capacitor 67, avoiding the need for D. C. coupling which often introduces other problems. The circuit therefore provides for squaring the top of the intensity control pulse as well as the area-balancing of the waveform. The diode 69 having its anode grounded and its cathode connected to the cathode ray tube cathode 71 maintains the latter just below ground potential except when the cathode ray tube beam current increases beyond the point where the voltage drop in resistor 73 exceeds the voltage applied, shown as —300 volts. At this point the sudden voltage rise on the cathode limits the beam current rather sharply to prevent excessive brilliance and burning of the cathode ray tube screen.

The anode pulser 13 and off-screen blanking circuit 17 are more fully described in the other applications identified above but will also be briefly described herein.

During any time of rapid deflection of the cathode ray tube beam increased anode voltage on the deflection driver amplifiers, is necessary to overcome the inductance of the deflection coils. This is accomplished by the anode pulser 13 in which a diode 31 connected to a low anode potential shown as 150 volts supplies the normal operating anode voltage for the drivers. A triode 33 connected to a high anode source of supply shown as 1000 volts can be operated during times of high deflection velocity to apply the high anode voltage to the deflection driver amplifiers. While this high voltage is being applied the diode 31 becomes nonconductive. A control circuit comprising a triode 35, resistor 37, and diode 39 in series with the anode of the diode connected to a moderate anode voltage shown as 300 volts normally applies a low voltage to the grid of triode 33 and therefore prevents its operation. However, when a negative pulse is applied to the grid of the triode 35 the voltage of its anode and that of the grid of triode 33 rises rapidly causing conduction in the triode 33. A coupling condenser 41 from the cathode of triode 33 to the cathode of diode 39 maintains the positive grid potential on the triode 33 by a bootstrap action and stops conduction in the diode 39 until termination of the negative pulse applied to the triode 35.

To provide off screen blanking, voltages corresponding to the NS and EW deflection coordinates are each combined first in diodes 81a–d to make their values dependent only on absolute coordinate magnitude, independent of the quadrant, then in resistor networks 83e–h so that coordinate values may be combined in several proportions. The largest of these combined values is then selected by diodes 85e–h and applied to control amplifier 87; if greater than a preset value determined by potentiometer 89 the cathode ray tube grid is biased to suppress the beam. The effect of combining the values in several proportions is illustrated by the several diagonal lines in Fig. 3 and the diode 85e–h serve to select those lines forming approximately a 90° arc.

In Fig. 2 several typical waveforms are shown to illustrate the operation of the system of Fig. 1. The various waveforms are identified according to the corresponding locations on Fig. 1. It is noted that the three inputs shown for each of the differential feedback systems are combined before actual use, but the combined waveform is not shown; the normal P. P. I. sweep voltages are gated off to permit inserting the square pulses corresponding to the computer outputs, and the circle drawing sine-cosine wave segments are merely added during such square pulses. The anode pulser input wave controls this circuit as indicated above to provide the required high voltage for the driver amplifier during the time of slewing. The pulse echo input on lead 91, tag intensification, and off-screen blanking are all related to the cathode ray tube control grid operation; as shown the echoes occur along the effective part of the normal sweep, the intensification occurs during the proper time for tag presentation, and the blanking occurs while the P. P. I. sweep is of too great amplitude and would extend beyond the cathode ray tube face.

A preferred embodiment of the invention has been described to facilitate an understanding of the invention, but many variations will be apparent to those skilled in the art.

What is claimed is:

1. A control circuit to establish predetermined voltage levels for control of a cathode ray tube during selected intervals independently of any irregularities in the occurrence of such intervals, comprising a normally energized time control triode deenergized during the selected intervals, a normally deenergized level control triode directly anode coupled to said time control triode, similar capacitive coupling circuits from the anodes of said triodes and similar bias control means both connected to the control grids of said level control triode and of a further normally deenergized output control triode.

2. A control circuit to establish predetermined voltage levels for control of a cathode ray tube during selected intervals independently of any irregularities in the occurrence of such intervals, comprising a normally energized time control triode deenergized during the selected intervals, a normally deenergized level control triode directly anode coupled to said time control triode, capacitors from the anodes of said triodes and bias control means forming coupling circuits of substantially equal time constant, both connected to the control grids of said level control triode and of a further normally deenergized output control triode.

3. In a cathode ray tube system involving irregularly occurring intervals of varying speeds of deflection, means to establish predetermined beam intensity levels during such intervals independently of any irregularities in the occurrence of such intervals, comprising a normally energized time control triode deenergized during the intervals the predetermined intensity is to be maintained, a normally deenergized level control triode directly anode coupled to said time control triode, similar capacitive coupling circuits from the anodes of said triodes and similar bias control means both connected to the control grids of said level control triode and of a further normally deenergized intensity control triode controlling the beam intensity of said cathode ray tube.

4. In a cathode ray tube system involving intervals of varying speeds of deflection, means to establish predetermined beam intensity levels during such intervals independently of any irregularities in the occurrence of such intervals, comprising a normally energized time control triode deenergized during the intervals the predetermined intensity is to be maintained, a normally deenergized level control triode directly anode coupled to said time control triode, capacitors from the anodes of said triodes and bias control means forming coupling circuits of substantially equal time constant, both connected to the control grids of said level control triode and of a further normally deenergized intensity control triode controlling the beam intensity of said cathode ray tube.

References Cited in the file of this patent

UNITED STATES PATENTS

| | | |
|---|---|---|
| 2,366,357 | Schlesinger | Jan. 2, 1945 |
| 2,426,419 | Spector | Aug. 26, 1947 |
| 2,444,036 | Crost | June 29, 1948 |
| 2,449,792 | Snyder | Sept. 21, 1948 |
| 2,693,530 | MacDonald | Nov. 2, 1954 |